United States Patent
Zaleski et al.

(10) Patent No.: US 9,360,025 B2
(45) Date of Patent: Jun. 7, 2016

(54) HYDRAULIC SOFT START SYSTEM

(71) Applicants: Edmund Joseph Zaleski, Dalton, OH (US); Paul D. Ellsworth, Richfield, OH (US)

(72) Inventors: Edmund Joseph Zaleski, Dalton, OH (US); Paul D. Ellsworth, Richfield, OH (US)

(73) Assignee: Maradyne Corporation, Cleveland, OH (US)

( * ) Notice: Subject to any disclaimer, the term of this patent is extended or adjusted under 35 U.S.C. 154(b) by 0 days.

(21) Appl. No.: 14/601,940

(22) Filed: Jan. 21, 2015

(65) Prior Publication Data

US 2015/0128584 A1 May 14, 2015

Related U.S. Application Data

(63) Continuation-in-part of application No. 14/058,825, filed on Oct. 21, 2013, now Pat. No. 9,239,065, which is a continuation-in-part of application No. 12/841,705, filed on Jul. 22, 2010, now Pat. No. 8,578,713.

(51) Int. Cl.

| | |
|---|---|
| *F15B 1/027* | (2006.01) |
| *F02N 9/04* | (2006.01) |
| *F15B 21/10* | (2006.01) |
| *F02N 7/00* | (2006.01) |
| *F15B 11/04* | (2006.01) |
| *B60K 6/12* | (2006.01) |
| *F02N 7/08* | (2006.01) |
| *F02N 15/04* | (2006.01) |

(52) U.S. Cl.
CPC . *F15B 1/027* (2013.01); *F02N 7/00* (2013.01); *F02N 9/04* (2013.01); *F15B 11/0406* (2013.01); *F15B 21/10* (2013.01); *B60K 2006/126* (2013.01); *F02N 7/08* (2013.01); *F02N 15/04* (2013.01); *F15B 2211/212* (2013.01); *F15B 2211/25* (2013.01); *F15B 2211/324* (2013.01); *F15B 2211/40507* (2013.01); *F15B 2211/50518* (2013.01); *F15B 2211/7058* (2013.01); *F15B 2211/851* (2013.01)

(58) Field of Classification Search
CPC .................................. F15B 21/10; F15B 1/027
See application file for complete search history.

(56) References Cited

U.S. PATENT DOCUMENTS

| | | | | |
|---|---|---|---|---|
| 3,384,027 A | * | 5/1968 | Jennings | F01B 3/106 123/179.31 |
| 3,722,209 A | * | 3/1973 | Kaytor | F01M 5/025 123/179.31 |
| 3,811,281 A | | 5/1974 | Wise et al. | |

(Continued)

OTHER PUBLICATIONS

Website Page—www.kocsistech.com/page_accessories.html dated May 5, 2009.

*Primary Examiner* — Thomas E Lazo
(74) *Attorney, Agent, or Firm* — Fay Sharpe LLP

(57) ABSTRACT

A hydraulic soft-start system includes a flow control valve which is in fluid communication with a pressure source and an inlet of a motor. The system includes a first flow restricting orifice and a second flow restricting orifice disposed between a pilot for actuating the flow control valve and the inlet of the motor. A first flow is passed from the pressure source via the first orifice to an inlet of the motor, placing the motor in a partially-actuated state. The flow control valve is actuated after a threshold pressure of the pilot is reached allowing a second flow to pass from the pressure source to the motor inlet. The second flow is higher than the first flow, thereby placing the motor in a fully-actuated state.

20 Claims, 13 Drawing Sheets

(56) References Cited

U.S. PATENT DOCUMENTS

| | | |
|---|---|---|
| 4,077,746 A | 3/1978 | Reynolds |
| 4,487,173 A | 12/1984 | Maucher et al. |
| 4,494,499 A | 1/1985 | Stein |
| 4,653,527 A | 3/1987 | Kosarzecki |
| 4,694,791 A | 9/1987 | Tanaka |
| 4,747,270 A * | 5/1988 | Klie .................... F02N 7/08 123/179.31 |
| 4,960,085 A | 10/1990 | Coons |
| 5,050,636 A | 9/1991 | Sagawa et al. |
| 5,255,644 A | 10/1993 | Mills et al. |
| 5,267,539 A | 12/1993 | Becker et al. |
| 5,337,713 A | 8/1994 | Mills |
| 5,381,823 A | 1/1995 | DiBartolo |
| 5,381,828 A * | 1/1995 | Kimura ................ F15B 11/068 137/596 |
| 5,542,384 A * | 8/1996 | Rosenmann .......... F16K 31/383 123/179.31 |
| 5,977,730 A | 11/1999 | Clutter et al. |
| 6,026,695 A | 2/2000 | Bartlett et al. |
| 6,079,957 A | 6/2000 | Jirele |
| 6,615,786 B2 * | 9/2003 | Mori ...................... F02N 7/00 123/179.31 |
| 6,718,763 B2 * | 4/2004 | Maruta ............... F15B 11/0423 60/456 |
| 6,736,099 B2 * | 5/2004 | Mori ...................... F02N 7/08 123/179.31 |
| 6,968,684 B1 | 11/2005 | Hauser et al. |
| 7,467,642 B2 | 12/2008 | Prinsen et al. |
| 7,766,105 B2 * | 8/2010 | Albright ................. A01C 3/06 180/53.61 |
| 7,891,375 B2 * | 2/2011 | Decker ............... F15B 11/0406 137/596.1 |
| 2006/0214035 A1 | 9/2006 | Albright et al. |

* cited by examiner

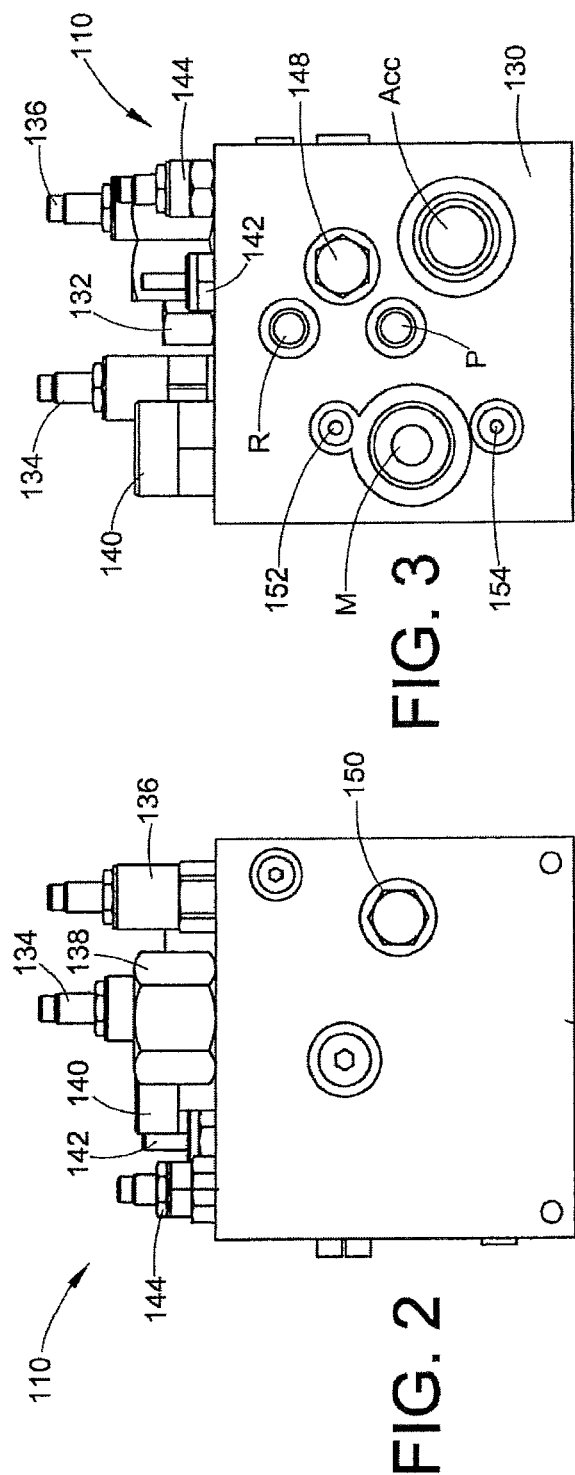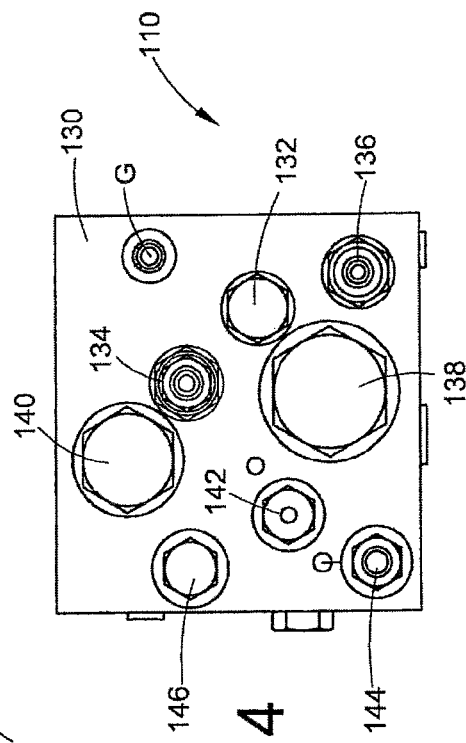

HYDRAULIC SOFT START SYSTEM

CLAIM OF PRIORITY

This application is a continuation-in-part of application Ser. No. 14/058,825, filed on Oct. 21, 2013 and still pending. That application, in turn, is a continuation-in part of application Ser. No. 12/841,705, filed on Jul. 22, 2010 and issued as U.S. Pat. No. 8,578,703 on Nov. 12, 2013. Both of those documents are incorporated herein by reference in their entireties.

BACKGROUND

The present application generally relates to the field of hydraulic power systems. In particular, the present application pertains to equipment capable of gradually engaging and/or driving a hydraulic motor (e.g., soft start systems).

In general, prior art hydraulic starting systems for starting a hydraulic motor involved the use of a primary flow control valve that slowly or partially opened to regulate the initial pressure and/or fluid flow to a hydraulic motor to be driven.

One problem associated with such prior art "soft start" systems is that they are not efficient in the use of the hydraulic fluid. For example, as the primary control valve is slowly opened, the pressure and flow is generally proportionally increased until the pressure and flow supplied to the hydraulic motor to be driven is adequate to begin to drive the motor and any load that may be applied to the motor. From the time of initial engagement of any and all intermediate transmission components and the actual rotation of the motor, any fluid pressure and flow that is bypassed or leaking through the system components is not producing any work. Thus, this lost fluid pressure and flow is directly attributable to the inefficiencies of such prior art systems.

This can be a particular concern in systems with a limited pressure reserve for powering a hydraulic motor for a limited period of time (e.g., a hydraulic accumulator based pressure source for starting an engine, etc.). As the primary flow valve (s) is/are throttled from a closed position to an open position, fluid pressure and flow are lost in the time it takes the flow and pressure to achieve a level necessary to engage and/or rotate the hydraulic motor (e.g., for purposes of starting an engine). As such, the fluid is less efficiently used during the time it takes the valve to go from fully closed to fully open, ultimately resulting in less work being performed by the motor (e.g., less cranking cycles available for hydraulically starting an engine).

Another problem which exists in these prior art systems, is that the various valves (e.g., relief valves, control valves, etc.) and/or other charging components are separated such that numerous individual connections must be made between these components using additional hydraulic lines and connectors. This increases not only the cost of such a system, but also the failure rate of the system, the potential for leaks, and the introduction of contaminants, etc.

Yet another problem which exists in the prior art, is that temperature fluctuations often create performance variations in the ability of the system to properly engage and/or start a hydraulic motor to be driven. As such, consistent and effective operation of such systems can be problematic when the system is subjected to fluctuating ambient conditions.

Even if a soft start valve is employed, it is generally externally plumbed meaning that there is a need for extra hydraulic fittings and hoses. Such external components are more likely to leak than components which are integrated into a housing. It would be advantageous to provide an integral soft start system in which such extra hydraulic fittings and hoses would be rendered unnecessary.

A yet further difficulty with such externally positioned soft start systems is that in a dual soft start environment, where two starters are utilized for an internal combustion motor, two separate synchronizer valves need to be employed, thereby further complicating the necessary plumbing for the system. As might be appreciated, the more individual valves and hoses that need to be used, the greater the chance that one of them will leak, leading to maintenance problems and a potential shut down of the entire system. It would be advantageous to integrate components into a housing thereby lessening the risk of leakage. Such integration could also simplify the plumbing of the system and may lead to the use of less valving and simpler valves.

For at least these reasons, a need exists to provide an improved hydraulic soft start system which overcomes the aforementioned problems and others.

BRIEF SUMMARY

According to one aspect of the present disclosure, an integrated soft start and hydraulic motor assembly comprises a valve housing, a pressure source port defined in the valve housing for receiving pressurized hydraulic fluid from an associated hydraulic pressure source and a hydraulic motor housing to which the valve housing is attached and with which the valve housing is in fluid communication. The associated hydraulic pressure source supplies hydraulic fluid to the valve housing which regulates a flow of the hydraulic fluid to the motor housing to start a hydraulic motor mounted in the hydraulic motor housing. A drain port is defined in the valve housing and is positioned in a downstream location from the hydraulic motor. A pilot operated flow control valve is located in the valve housing and includes a pilot, a drain, an inlet and an outlet. The inlet is in fluid communication with the pressure source port, the drain is in fluid communication with a drain port, and the outlet is in fluid communication with the hydraulic motor. A first flow restricting orifice is located in the valve housing in fluid communication with and disposed between the pressure source port and the hydraulic motor. A second flow restricting orifice is located in the valve housing in fluid communication with and disposed between the pilot and the hydraulic motor. When pressurized hydraulic fluid is supplied to the pressure source port, a first fluid flow is passed from the pressure source port via the first orifice to the hydraulic motor placing the hydraulic motor in a first partially actuated low power state. A portion of the first fluid flow is passed via the second orifice to the pilot placing the valve in an open state after an actuation pressure is reached. A second fluid flow is then allowed to pass from the pressure source port to the hydraulic motor with a pressure of the second fluid flow being higher than a pressure of the first fluid flow thereby placing the hydraulic motor in a second fully actuated high power state subsequent to the first partially actuated low power state.

According to another embodiment of the present disclosure, an integrated dual soft start assembly comprises a first housing including a first motor section, including a first motor gear, and a first valve section operably connected to the first motor section, wherein the first valve section is in fluid communication with the first motor section. A second housing includes a second motor section, including a second motor gear, and a second valve section operably connected to the second motor section wherein the second valve section is in fluid communication with the second motor section. The first and second motor sections are operably connected to a respective associated starter pinion. A synchronizer valve communicates with first and second pilot operated flow control valves located, respectively, in the first and second valve sections. The synchronizer valve selectively directs a pressurized hydraulic fluid to respective pilots of the first and second pilot operated flow control valves to selectively actuate both the first and second motor gears simultaneously.

In accordance with still another embodiment of the present disclosure, an integrated starter assembly comprises a valve housing and a motor housing to which the valve housing is attached and with which the valve housing is in hydraulic fluid communication. An associated hydraulic pressure source supplies hydraulic fluid to the valve housing. A pilot operated flow control valve is located in the valve housing for regulating a flow of the hydraulic fluid to the motor housing to start a hydraulic motor mounted in the motor housing. The flow control valve includes a pilot, and inlet, and an outlet, the inlet being in fluid communication with a pressure source port defined on the valve housing and the outlet being in fluid communication with the hydraulic motor. A first flow restricting orifice is located in the valve housing and is in fluid communication with and disposed between the pressure source port and the hydraulic motor. A conduit is located in the valve housing and is in fluid communication with the pilot. Once pressurized hydraulic fluid is supplied, a first fluid flow is passed via the first orifice to the hydraulic motor in a first partially actuated low power state, and a second fluid flow is passed via the conduit to the pilot placing the valve into an open state after an actuation pressure is reached thus allowing a second fluid flow to pass to the hydraulic motor, a pressure of the second fluid flow being higher than is a pressure of the first fluid flow thereby placing the hydraulic motor in a second fully actuated high power state subsequent to the first partially actuated low power state.

BRIEF DESCRIPTION OF THE DRAWINGS

The present disclosure may take form in various components and arrangements of components and various steps and arrangement of steps. The drawings are only for purposes of illustrating various embodiments of the present disclosure and are not to be construed as limiting the disclosure.

FIG. 2 is a front side view of a first embodiment of a hydraulic soft start assembly, of the system of FIG. 1.

FIG. 3 is a left side view of the hydraulic soft start assembly of FIG. 2, illustrating the location of a plurality of hydraulic ports and orifices.

FIG. 4 is a top plan view of the hydraulic soft start valve assembly of FIG. 2, illustrating a plurality of cartridge style hydraulic valves.

DETAILED DESCRIPTION

Hydraulic soft start systems are advantageous over a variety of other types of starting systems for internal combustion engines, including electric starters, pneumatic starters and spring starters. A hydraulic start system will accelerate an engine to a higher speed than any of the other starting systems which is particularly advantageous for diesel engines, where the temperature of the combustion chamber needs to rise to the point where it will ignite the injected diesel fuel. On the other hand, soft start systems are necessary for such hydraulic starter systems in order to limit the torque applied to the engine until the mating gears are fully engaged, thereby reducing the shock of engagement as that could shorten the service life of the engine or the starter, or both. Hydraulic starters are also advantageous from the perspective that they are generally insensitive to temperature variations and can, thus, work at even negative temperatures, such as −40° C. Such starting systems are ideal for diesel engines, for example on mining equipment or ships, as well as a variety of other applications.

Figure 1:
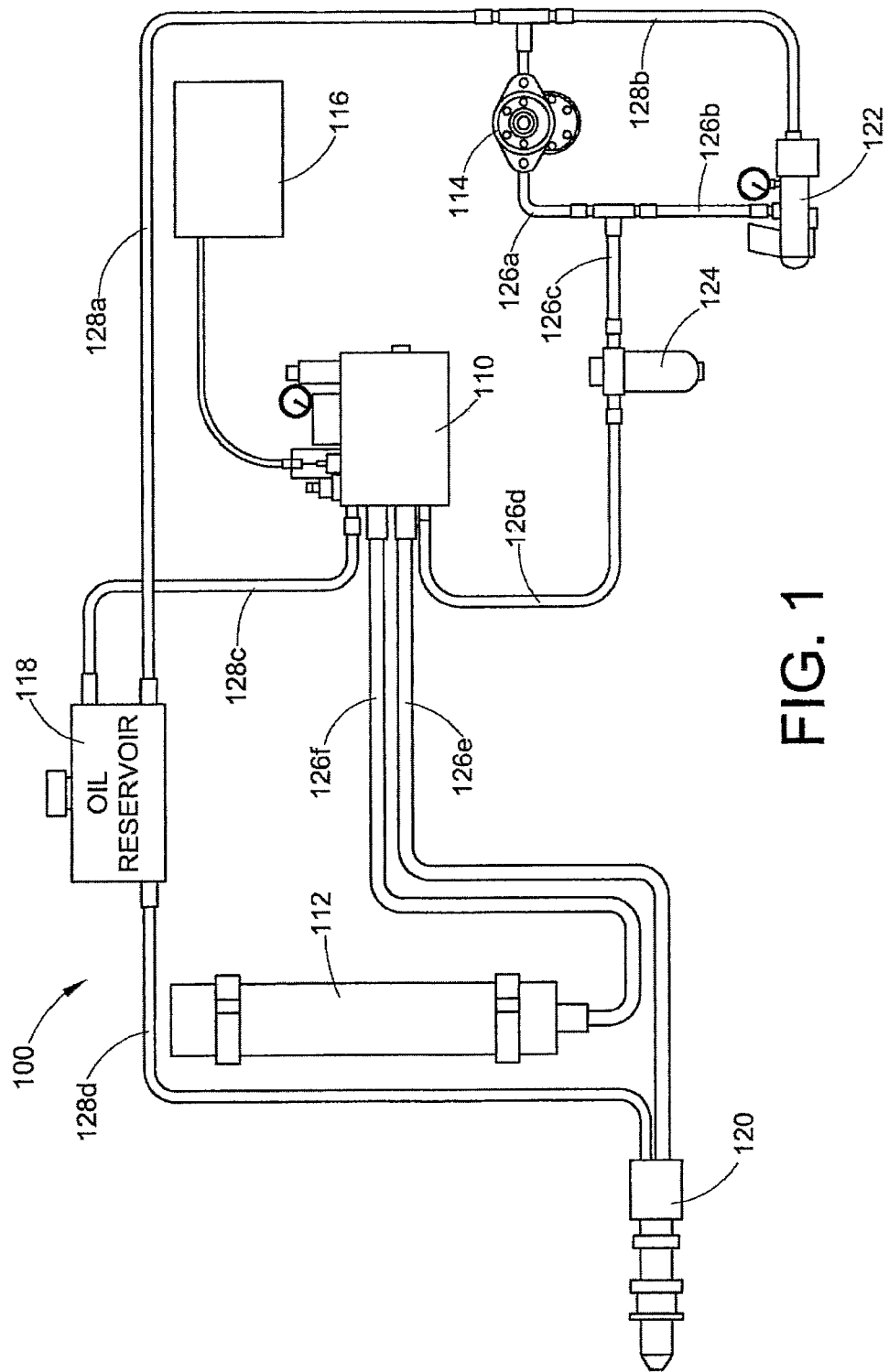
FIG. 1 is a schematic illustration of a first embodiment of a hydraulic soft start system, according to the present disclosure.

With reference to FIG. 1, a first embodiment of a hydraulic soft start system 100 is there illustrated. By way of example only, the system 100 will be described with reference to an engine starting circuit for starting an internal combustion engine. As illustrated in FIG. 1, the system 100 may include a soft start manifold assembly 110, a hydraulic pressure source (e.g., an accumulator 112 or other hydraulic pressure and flow generating device), a hydraulic pump 114 for charging or pressurizing the accumulator 112, a control panel 116 for remotely controlling the soft start manifold assembly 110 or the system 100, an oil reservoir 118, and an associated hydraulic motor to be driven 120. The hydraulic motor can, in turn, be used to start an internal combustion engine (not shown), if so desired. However, it should be noted that the system 100 or slight variations of the system 100 could be used to drive other mechanical and/or transmission related equipment (e.g., construction and farming equipment, transportation systems, amusement rides, elevators, lifts, and/or various other commercial and/or residential applications, etc.).

In addition, the system 100 may include a manual hand pump 122 for charging the pressure source or accumulator 112 (e.g., under conditions when the hydraulic pump 114 is not available to pressurize the accumulator 112). Also, a high pressure filter 124 may be provided for filtering out foreign particles from the working fluid. In the system 100 where both the manual hand pump 122 and the hydraulic pump 114 are included (as illustrated in FIG. 1), a shuttle valve 125 can be disposed between the outlets of the respective pumps 114, 122 to prevent pressurized fluid, discharged by the active pump, from back-flowing through the inactive pump (which would effectively bypass the rest of the system 100). As such, the shuttle valve 125 (being pressure activated) directs the pressurized fluid from the output of the active or pump-in-use to high pressure filter 124. Furthermore, a series of high pressure hydraulic fluid lines 126A-126F and a series of low pressure hydraulic fluid lines 128A-128D are used to connect the various system components in the manner illustrated, by way of example only, in FIG. 1.

In general, low pressure fluid is drawn from the oil reservoir 118 by either the pump 114 (which may be engine driven) or the manual hand pump 122. With continued reference to FIG. 1, pressurized fluid then exits the driven pump 114 or hand pump 122 and proceeds through the shuttle valve 125 and the high pressure filter 124 to the soft start manifold assembly 110. Depending on the various conditions of the system and the operating state of the manifold assembly 110, fluid is either provided to the hydraulic pressure source or accumulator 112, to the hydraulic motor to be driven 120 and/or returned to the oil reservoir 118. Similarly, depending on the state of the operation of the system, the accumulator 112 is either being charged with hydraulic fluid, being maintained at certain pressure level, or being discharged through or by the manifold assembly 110. Once charged, the fluid from the accumulator 112 can be eventually passed through manifold assembly 110 to the hydraulic motor 120 and returned to the oil reservoir 118. The operation of the system 100, and particularly the arrangement and operation of the manifold assembly 110, are discussed in greater detail below.

With reference now to FIGS. 2-4, a front, left, and top side view of the manifold assembly 110 is illustrated, respectively. As shown in FIGS. 2-4, the manifold assembly 110 generally includes a manifold or other valve body housing 130 that can be fabricated from any material having the appropriate strength and fatigue properties for withstanding the operating pressures used by the hydraulic soft start system. While a system capable of operating under extreme pressures could be designed, it would be generally adequate and cost effective for most systems to be designed for a maximum operating pressure of between 3000-4000 psi.

With continued reference to FIGS. 2-4, disposed either internally to or partially within the manifold or housing 130 are a plurality of valves, orifices and/or plugs. In particular, the soft start manifold assembly 110 may include an unloading valve 132 (which may be a vented spool logic valve), a pressure sensing valve 134 (or adjustable unloading pilot valve), a relief valve 136 (which may be an adjustable direct acting poppet relief valve), a first flow control valve 138 (which can be a spring biased vented poppet type logic valve), and a second flow control valve 140 (which can be a piloted two way spool valve). In addition, the manifold assembly 110 may include a manually operated pull valve 142 (which may be a manual pull-to-open spring return valve), a system bypass valve 144 (which may be an adjustable needle valve), a first check valve 146, a second check valve 148 and a third check valve 150. Furthermore, the manifold assembly 110 may include a first flow restricting orifice 152, a second flow restricting orifice 154, and a variety of fluid connection ports including a gauge port G, an accumulator or pressure source port ACC, a reservoir port R, a pump port P and a high pressure supply port for the hydraulic motor M. The arrangement, operation, and interconnections of the aforementioned manifold components are discussed in greater detail below with reference to FIG. 5.

Figure 5:
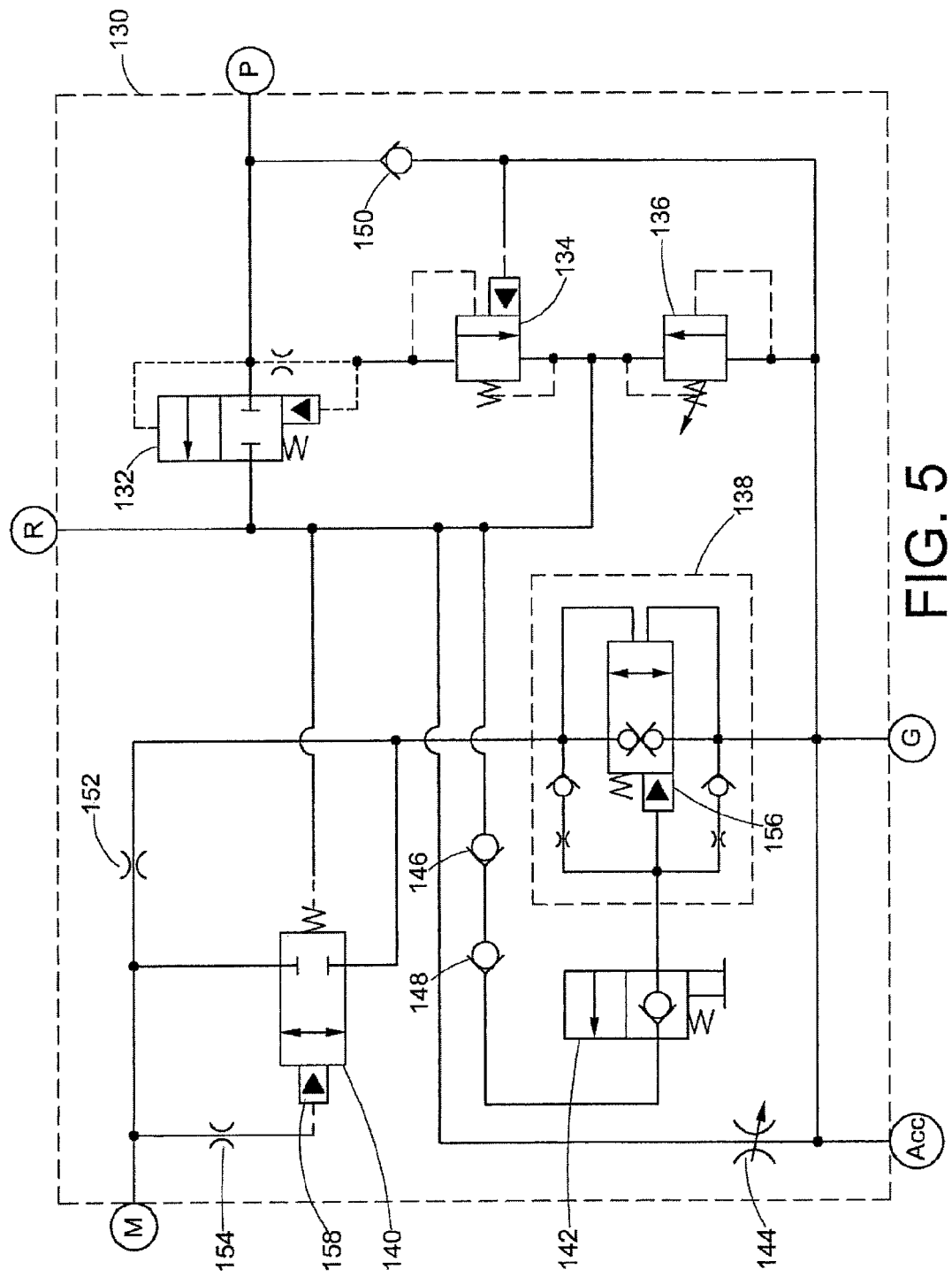
FIG. 5 is a hydraulic schematic of the hydraulic soft start assembly of FIG. 2.

Now with particular reference to FIG. 5, a schematic diagram of the manifold assembly 110 is provided which illustrates the internal connections between the various components that are disposed either partially or entirely within the manifold assembly. The components of the manifold assembly can be generally divided into three categories: 1) driving components for engaging/driving the hydraulic motor; 2) charging components for charging the pressure source (i.e., the accumulator); and 3) safety/bypass components. The driving components may include the first flow control valve 138, the second flow control valve 140, the manual pull valve 142, first and second check valves 146,148, and first and second flow restricting orifices 152, 154. As will be discussed below, the driving components cooperate to pass fluid from the accumulator port ACC to the motor port M of the manifold assembly to engage/drive the hydraulic motor of the system. The charging components of the manifold assembly may include the unloading valve 132, pressure sensing valve 134, and the third check valve 150. Here, the charging components cooperate to pass fluid from the pump port P to the accumulator port ACC to charge the accumulator with hydraulic fluid to a set or particular charge pressure. Finally, the safety/bypass components of the manifold assembly may include the relief valve 136 (for protecting the manifold assembly and other system components from being damaged due to overpressurization) and the bypass valve 144 (for allowing bypass of any flow from the pump as well as any fluid pressure and flow from the accumulator to the reservoir port R).

Now with reference also to FIGS. 1-5, the general sequence of operation for the manifold assembly 110 will be described with reference to the schematic diagram provided in FIG. 5. In general, the operation of the manifold assembly 110 involves 1) charging the system for use (i.e., unloading, relief and bypass circuitry operation) and 2) actuation/engagement/driving of the hydraulic motor or starter motor (i.e., the soft start valve system circuit operation).

With regard to charging the system for use, hydraulic fluid pressure (from the pump 114) is applied to the port P of the manifold assembly 110. This hydraulic fluid passes through the third check valve 150 to the accumulator port ACC where it is then stored in the accumulator 112. A pressure gauge may also be connected to port G to indicate the charge pressure of the accumulator 112. This same fluid pressure is also applied to the unloading valve 132 (which may be a vented spool logic valve), the pressure sensing valve 134 (which may be an adjustable unloading pilot valve), the relief valve 136 (which may be a direct acting poppet relief valve), the first control valve or "starter" control flow valve 138 (which may be a spring biased poppet valve), and the system bypass valve 144 (which may be an adjustable needle valve).

With continued reference to FIGS. 1-5, when pressure reaches an unloading set point of the pressure sensing valve 134, the pressure sensing valve shifts to vent a bias chamber in the unloading valve 132. This action creates a pressure differential across the unloading valve and when the force created by the pressure differential exceeds a bias spring force of the unloading valve, the unloading valve shifts open. When the unloading valve 132 shifts open, hydraulic pressure from the pump port P is redirected through the unloading valve 132 to the reservoir port R and back to the "supply tank" or reservoir 118. At this point, the pressure differential across the third check valve 150 causes the third check valve 150 to seat preventing any loss of pressure stored in the accumulator 112 connected to the accumulator port ACC.

It should be noted that, in the event the unloading valve 132 fails to shift when the pressure sensing valve 134 shifts or if the pressure sensing valve 134 fails to shift at its proper set point, then relief valve 136 will shift at its preset pressure (for example, at 3300 psi) and relieve excess system pressure through the reservoir port R and back to the reservoir 118.

Fluid will continue to flow through the relief valve 136 until pressure drops below the reset pressure point of the relief valve 136, at which time the relief valve 136 will reseat and the system will again begin to build pressure until either the pressure sensing valve 134 and the unloading valve 132 shift properly or until relief valve 136 once again opens providing over-pressure protection for the system.

A "stand-by" or "bypass" mode is reached when the unloading valve 132 has shifted and is bypassing flow to the reservoir port R. At this point, the system should be fully charged and ready to actuate the starter or hydraulic motor 120. As noted previously, the bypass valve 144 is used to vent the system and to relieve pressure when needed from the accumulator 112 to the reservoir 118. It is thus typically left in a "normally closed" state.

Now, with continued reference to FIGS. 1-5, the operation of the manifold assembly 110 (i.e., a "start" or "driving" cycle) with regard to actuating, engaging, and/or driving the starter or hydraulic motor 120 will be discussed. The start or driving cycle can be initiated at any time but to maximize the effectiveness, as for example in starting an engine, it is best to let the system reach the "stand-by" mode prior to initiating the cycle. By way of example, the start cycle can be initiated by pulling the manual pull valve 142 (which may be a pull to open, spring return valve). Opening the manual pull valve 142 creates a vent path from a pilot 156 and/or spring chamber in the first control valve 138 through the manual pull valve 142 and the first and second check valves 146,148 to the reservoir port R and back to the reservoir. Venting the first control valve 138 creates a pressure differential across the spring chamber, which eventually overcomes the spring bias force allowing the first control valve to shift open. It should be noted that, any number of methods or combinations could be used to activate or open the first control valve or any of the flow control devices discussed herein (e.g., electrically actuated via solenoid, hydraulically by pilot pressure differential, or manually, etc.).

As the first control valve 138 shifts open, pressurized hydraulic fluid is allowed to flow from the accumulator port ACC to the "main" or second flow control valve 140 (which may be a piloted two-way spool valve) and through the first flow restricting orifice 152. At this stage, a first fluid flow (being of relatively low flow/pressure) passes through the first orifice 152 to the starter or hydraulic motor 120 (via the motor port M) and eventually through the "timing" or second flow restricting orifice 154. As this first lower fluid pressure and flow are applied to the motor 120, the motor starts to rotate gradually engaging the load or other transmission components to be driven. With reference to the present example of the engine soft start system, the starter motor rotates causing a starter drive mechanism of the starter motor to move forward until it contacts a flywheel of the engine. Once the starter engages the flywheel its free movement is obstructed and backpressure builds in the high pressure hydraulic line connected to the inlet of the starter motor. This backpressure also naturally occurs at motor port M and the second flow restricting orifice 154. The primary purpose of the second flow restricting orifice 154 is to slow the transmission of the backpressure being induced at motor port M to a pilot 158 or pilot chamber of the second flow control valve 140. By slowing the transmission of this backpressure, the starter motor is given an ample opportunity to properly index, if necessary, in order to fully engage the flywheel. Once the pressure applied to the pilot chamber 158 of the second flow control valve 140 (through second flow restricting orifice 154) is sufficient to overcome a spring bias force of the second flow control valve, the valve shifts open. When the second flow control valve 140 shifts open, it supplies a second fluid flow that is higher than the first fluid flow in terms of one or both of pressure and/or volumetric flow rate to the starter (or other driven hydraulic motor). This second higher fluid flow causes the motor to rapidly reach its full speed and torque capability.

The start or driving cycle is complete when (1) all of the hydraulic pressure from the accumulator 112 (or other pressure source) is discharged and pressure falls below that needed to keep the second control valve 140 open against its spring bias force causing the second control valve 140 to close and stopping the fluid flow to the starter or motor 120 or (2) the manual pull valve 142 is released and its spring force returns the manual pull valve 142 to the closed position, closing off the vent path of the pilot and/or spring bias chamber of the first control valve 138. When the differential pressure in the pilot and/or spring chamber (necessary to maintain the first control valve 138 open) ceases to exist, the first control valve 138 then closes. This removes the pressure necessary to keep the second control valve 140 open, ultimately causing the second control valve 140 to close and stopping flow to the starter.

It should be noted that, at any time, if pressure at the pressure sensing valve 134 drops below the set point of the pressure sensing valve 134, the pressure sensing valve 134 will shift causing the unloading valve 132 to shift back to its closed position to permit the accumulator 112 to charge or build up pressure once again. Also, it should be noted that the control panel 116 of the system can be connected to the manual pull valve 142 via cable or other electrical and/or mechanical connection so as to provide for remote operation of the manifold assembly 110.

Figure 6:
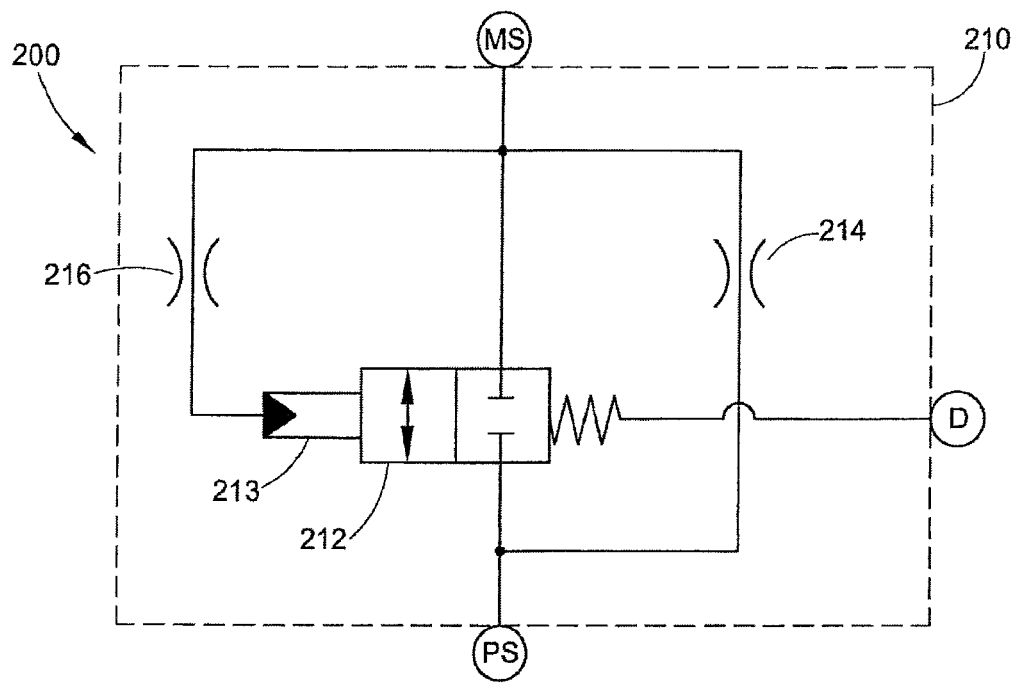
FIG. 6 is a hydraulic schematic of a second embodiment of a hydraulic soft start device, according to the present disclosure.
Figure 7:
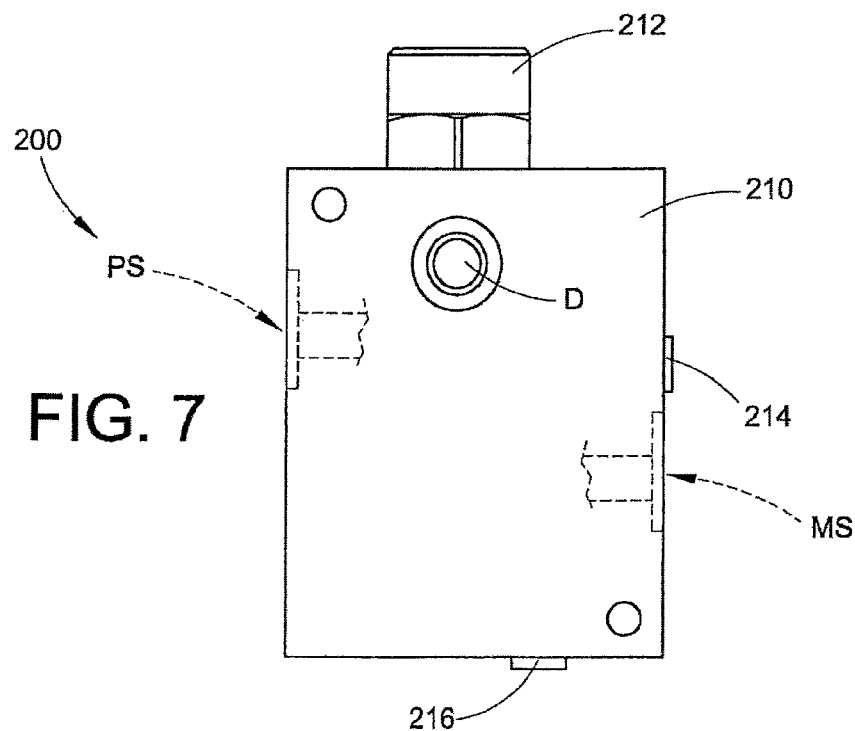
FIG. 7 is a front view of the second embodiment of the hydraulic soft start device according to FIG. 6.

Now with reference to FIGS. 6 and 7, a unitary hydraulic soft start valve assembly 200 is shown and may include a housing 210, a flow control valve 212 (which can be a piloted two-way spool valve), a first flow restricting orifice 214 and a second flow restricting orifice 216, as well as a pressure source port PS, a drain port D and a motor supply port MS. The flow control valve 212 of the unitary soft start valve assembly 200 operates in much the same way as discussed with respect to the second flow control valve 140 of the manifold assembly 110 in that it is also actuated by way of a hydraulic pilot 213. A pressurized hydraulic fluid can be supplied at pressure source port PS, at which point, a first fluid flow is allowed to pass through the first restricting orifice 214 into the motor supply port MS (and placing the attached motor in a first partially actuated or low power state). Simultaneously, a portion of the first fluid flow passing through the first orifice 214 will eventually pass through the second restricting orifice 216 to the pilot or pilot chamber 213 of the flow control valve 212. As before, once the backpressure at the motor supply port reaches an adequate threshold (e.g., after indexing and full engagement or coupling of the motor to the associated load) so as to cause the flow through the second orifice 216 to act upon the pilot, the flow control valve 212 will then shift to an open position. Once the flow control valve 212 shifts to the open position, a second fluid flow (which is higher than the first fluid flow in terms of one or both of pressure and/or volumetric flow rate) is allowed to pass from the pressure source port PS to the hydraulic motor supply port MS, thereby placing the associated motor in a second fully actuated high power state subsequent to the initial first partially actuated low power state. As before, this allows the motor to fully index, engage, and/or begin to drive the associated load or other transmission components. As is evident from the above disclosure, this is necessary to prepare the system for full power application (and to avoid any possibility of mal-alignment of transmission components and/or to avoid or lessen the inertial shock to the load, motor, etc.). In the meantime, such "soft starting" is accomplished with greater efficiency and a minimal loss of fluid pressure or flow by comparison to the "throttled" prior art approach.

It should also be noted, that as before, the first flow restricting orifice 214 can be of a larger diameter than the second flow restricting orifice 216 such that a proportionally lower fluid flow passes through the second restricting orifice as opposed to the first restricting orifice. It should further be noted, with regard to either of the above described embodiments, that the first flow restricting orifice may include an orifice sized diameter of approximately 0.125 inches and the second flow restricting orifice may include an orifice diameter of approximately 0.020 inches. The first flow restriction orifice will thus allow a proportionally greater fluid flow (i.e., a higher volumetric flow rate and a lower pressure drop) through the first orifice as compared to the second orifice.

Figure 8:
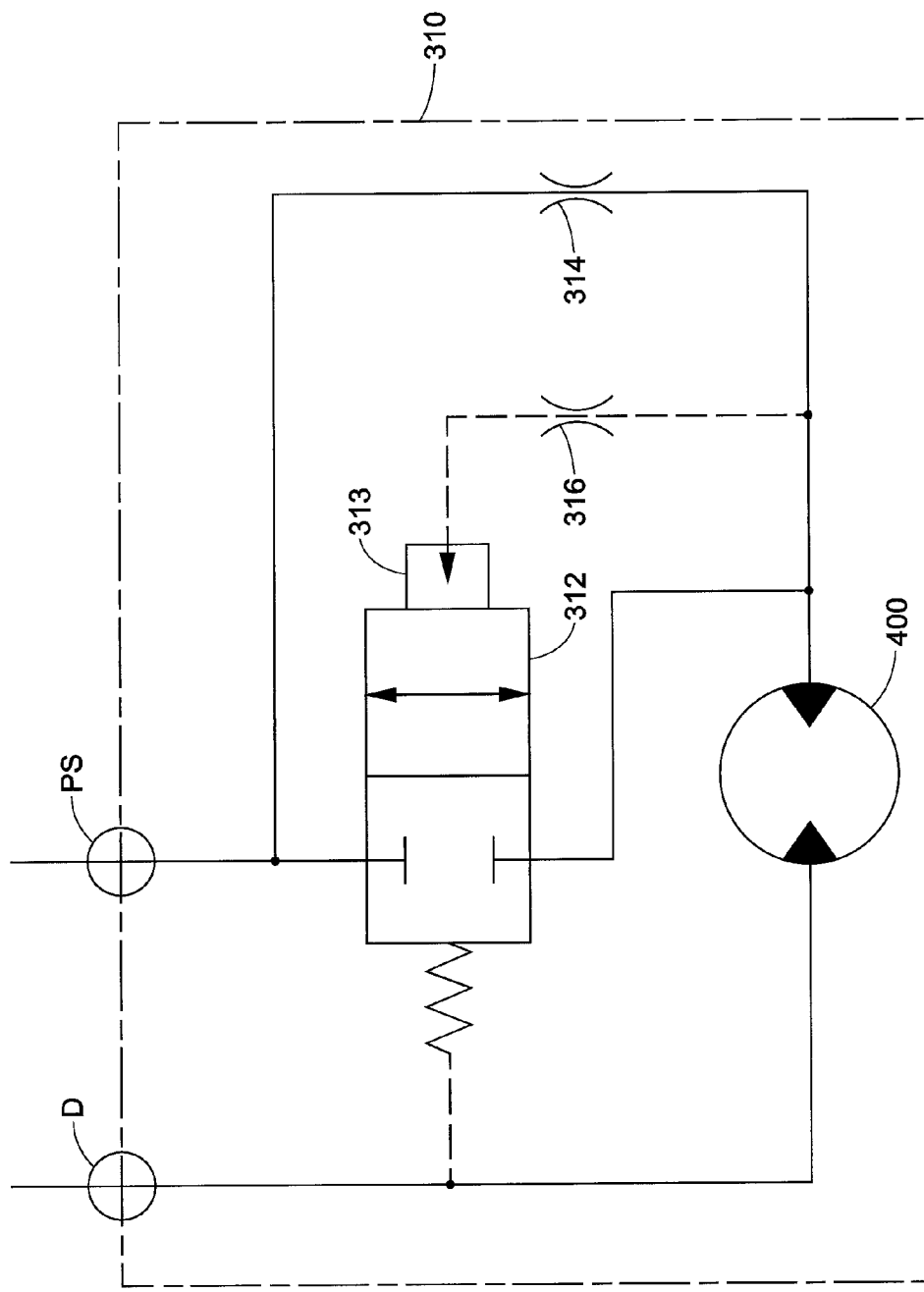
FIG. 8 is a hydraulic schematic of a third embodiment of a hydraulic soft start system, according to the present disclosure.
Figure 9:
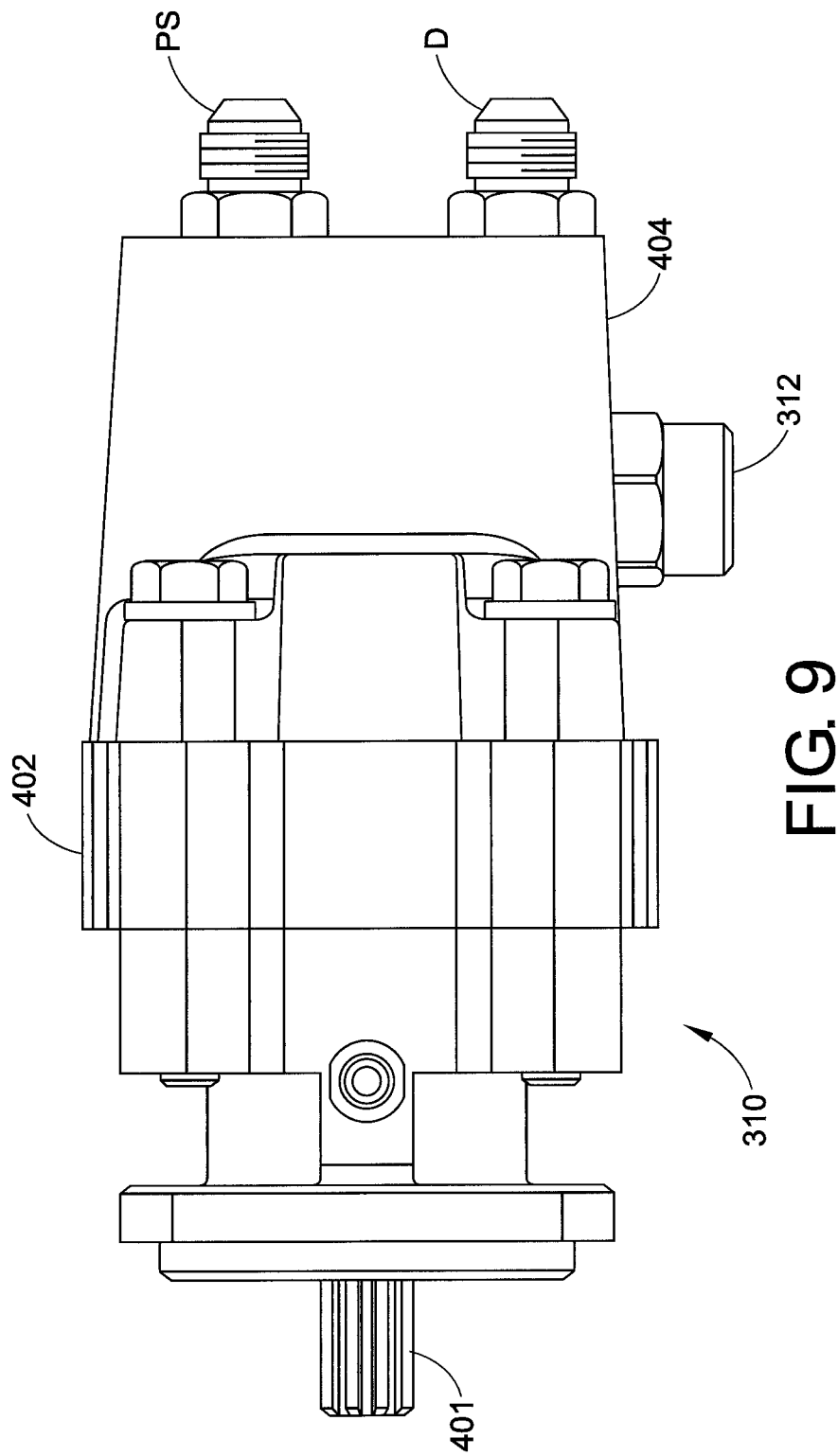
FIG. 9 is a side elevational view of the hydraulic soft start system of FIG. 8.

Now with reference to FIGS. 8 and 9, a unitary hydraulic soft start system can be integrated with a hydraulic motor. Such a system can include a housing 310, which accommodates a flow control valve 312 (which can be a piloted two-way spool valve), a first flow restricting orifice 314 and a second flow restricting orifice 316, as well as a pressure source port PS, a drain port D and a hydraulic motor 400. The first flow restricting orifice 314 can have a larger diameter than the second flow restricting orifice 316. In one embodiment, the first flow restricting orifice has a diameter of 0.125 inches whereas the second flow restricting orifice has a diameter of 0.020 inches. Thus, hydraulic fluid flows more readily through the first orifice 314 than through the second orifice 316. However, once the hydraulic fluid starts to rotate the motor 400, the pressure of the fluid increases and eventually fluid will flow through the second orifice 316. The pressurized hydraulic fluid then urges movement of the flow control valve 312 via the hydraulic pilot 313 against the bias of the spring. Now, the valve will open and hydraulic fluid at full pressure can then flow to the motor 400.

The housing 310, flow control valve 312, first flow restricting orifice 314, second flow restricting orifice 316, pressure source port PS and drain port D are all integrated and can be located within a port end cover 404 of the housing 310. The motor 400 can be a geared hydraulic motor located in a center housing section 402 from which protrudes an output shaft 401 of the motor 400. The center section contains the gear set. Forwardly of that are the primary and secondary shaft seals, the forward shaft bearing and the case drain cavity. These are held in a portion called the shaft end cover of the housing 310. The flow control valve 312 of the unitary soft start system operates in much the same way as discussed with respect to the second flow control valve 140 of the manifold assembly 110 in that it is also actuated by way of the hydraulic pilot 313.

A pressurized hydraulic fluid can be supplied at pressure source port PS (from a pump), at which point, hydraulic fluid at a first pressure is allowed to pass through the first restricting orifice 314 into the motor 400 which then begins to turn in a first partially actuated or low power state. A portion of the hydraulic fluid passing through the first orifice 314 will eventually pass through the second restricting orifice 316 to the pilot or pilot chamber 313 of the flow control valve 312. As before, once the backpressure at the motor supply port reaches an adequate threshold (e.g., after indexing and full engagement or coupling of the motor to the associated load) so as to cause the flow through the second orifice 316 to act upon the pilot, the flow control valve 312 will then shift to an open position. Once the flow control valve 312 shifts to the open position, the hydraulic fluid (which is now greater in terms of one or both of pressure and/or volumetric flow rate) is allowed to pass from the pressure source port PS to the hydraulic motor 400, thereby placing the hydraulic motor (which may be a gear hydraulic motor) in a second fully actuated high power state subsequent to the initial first partially actuated low power state. As before, this allows the motor to fully index, engage, and/or begin to drive the associated load or other transmission components.

As is evident from the above disclosure, it is necessary to prepare the system for full power application (and to avoid any possibility of mal-alignment of transmission components and/or to avoid or lessen the inertial shock to the load, motor, etc.). In the meantime, such "soft starting" is accomplished with greater efficiency and a minimal loss of fluid pressure or flow by comparison to the "throttled" prior art approach.

It should also be noted, that as before, the first flow restricting orifice 314 can be of a larger diameter than the second flow restricting orifice 316 such that a proportionally lower fluid flow passes through the second restricting orifice as opposed to the first restricting orifice. As shown in FIG. 8, the first flow restricting orifice 314 may include an orifice diameter of approximately 0.125 inches and the second flow restricting orifice 316 may include an orifice diameter of approximately 0.020 inches. Thus, the first flow restriction orifice will thus allow a proportionally greater fluid flow (i.e., a higher volumetric flow rate and a lower pressure drop) through the first orifice as compared to the second orifice.

Figure 14:
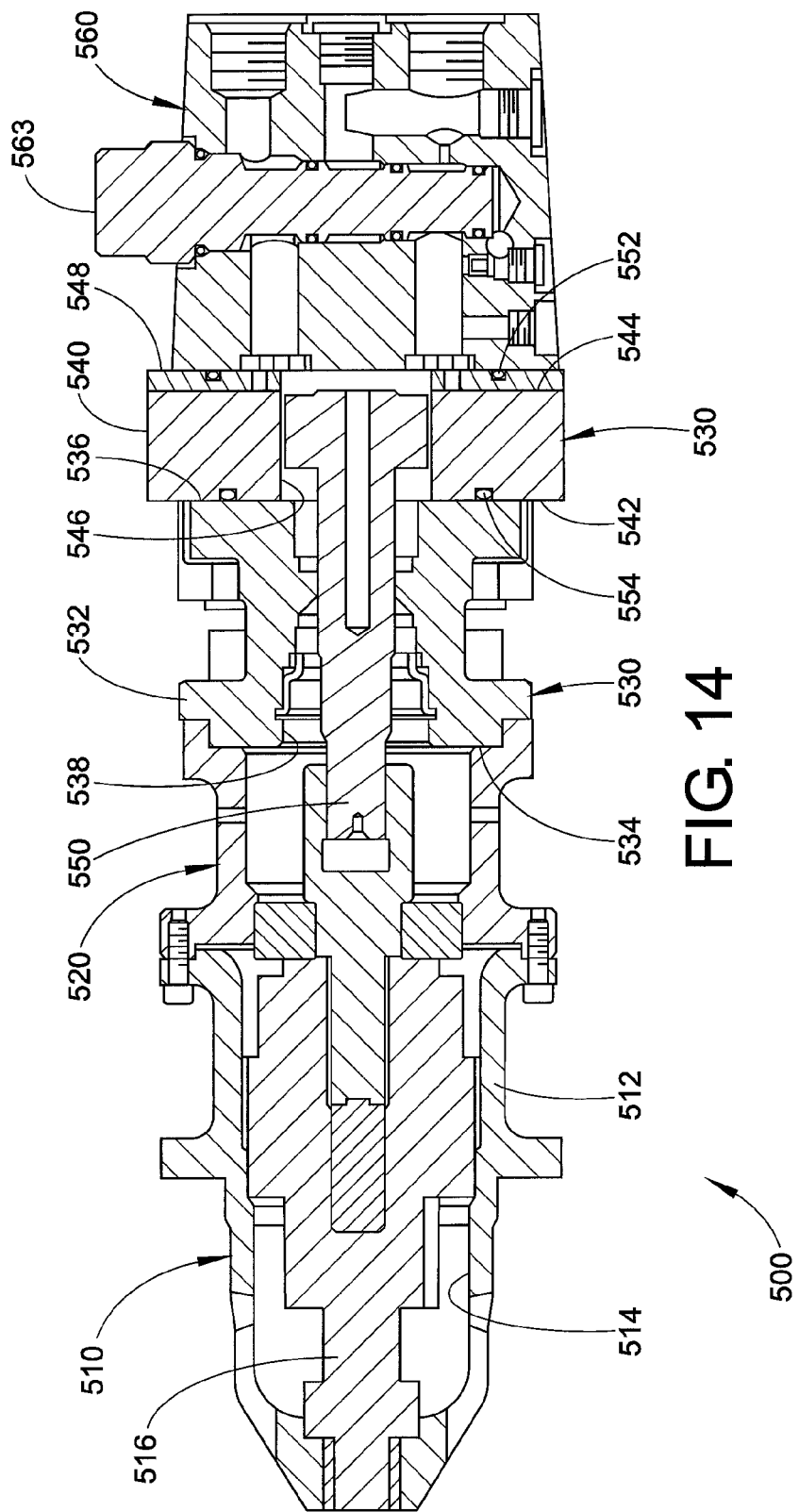
FIG. 14 is a cross sectional view through the system of FIG. 11 along line 14-14.

With reference now to FIG. 14, an integrated soft start and hydraulic motor assembly 500 includes a starter 510 which comprises a housing 512 having a hollow interior 514 accommodating a starter pinion 516. A spool 520 can be employed to connect the starter 510 to a hydraulic motor 530. More particularly, the spool 520 connects the starter housing 512 to a first housing section 532 of the hydraulic motor. The first housing section includes a distal end 534, a proximal end 536 and a bore 538 extending between the proximal and distal ends. The hydraulic motor can also include a second housing section 540 having a distal end 542, a proximal end 544 and a bore 546. It should be appreciated from FIG. 14 that the bores 538 and 546 are aligned. A relatively thin plate 548 can be mounted to the proximal end 554 of the second housing section. A motor gear 550 extends through the aligned bores. The plate 548 also includes an annular groove or channel 552 which accommodates a suitable sealing element, such as an O-ring. The distal end 542 of the second housing section can be provided with a similar groove or channel 554 also for accommodating a suitable sealing element therein.

Figure 13:
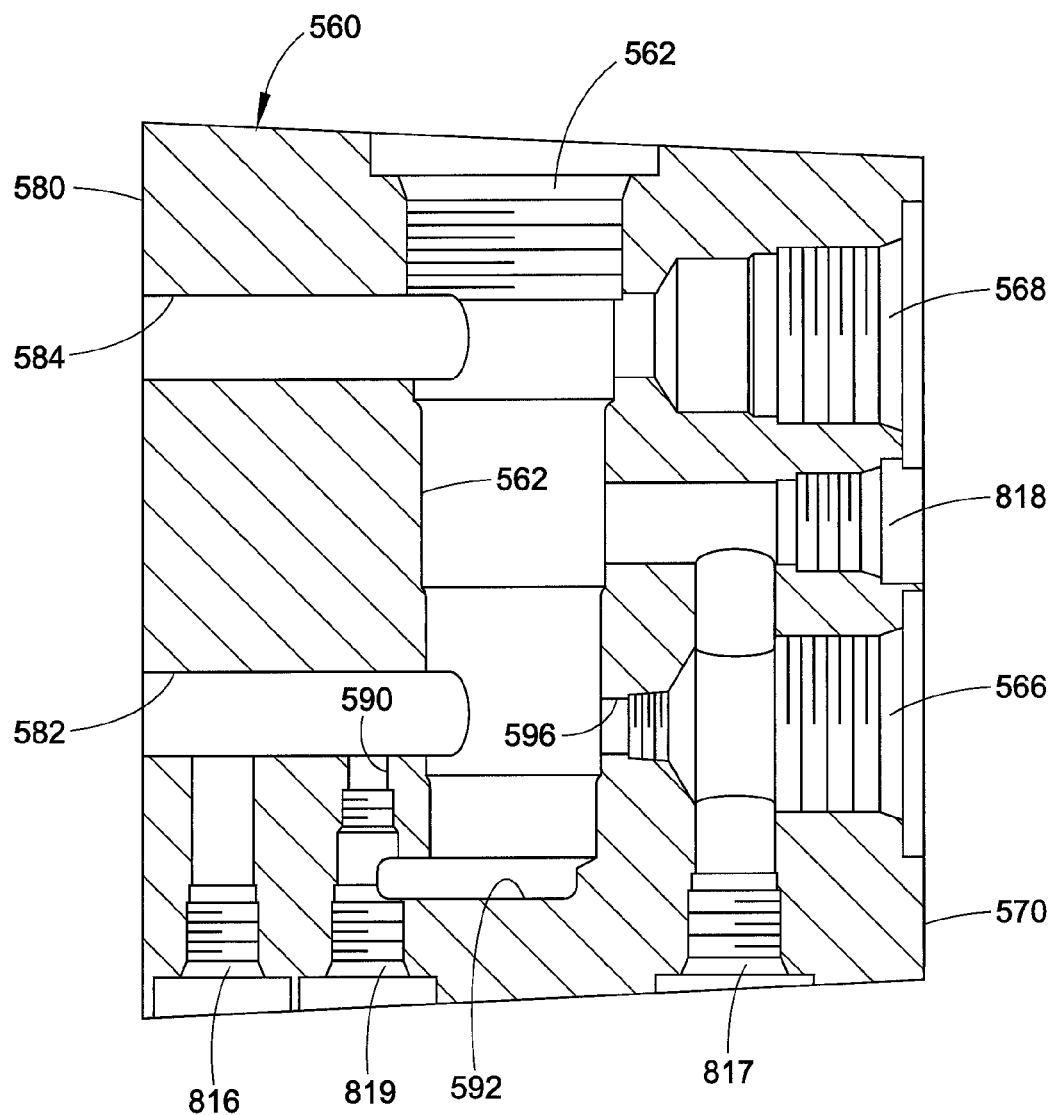
FIG. 13 is an enlarged cross sectional view through the valve housing of FIG. 12 along line 13-13.

Connected to the hydraulic motor 530 is a hydraulic valve housing 560. With reference now also to FIG. 13, the hydraulic valve housing can comprise a cavity 562 for accommodating a spool valve 563 (FIG. 11) which extends into the valve housing from a side face 564 thereof. Communicating with the cavity is a motor inlet 566 and a motor outlet 568 spaced therefrom. These terminate at a proximal face 570 of the motor housing. Extending into the motor housing from a distal face 580 thereof is a fluid inlet 582 and a fluid outlet 584. It should be appreciated from FIG. 14 that the fluid inlet 582 and outlet 584 communicate with the bore 546 extending through the housing sections 532 and 540 of the hydraulic motor 530. In this way, hydraulic fluid can act on a piston face 586 of the motor gear 550.

With reference again to FIG. 13, communicating with the motor inlet 582 is a small orifice 590 which also communicates with a distal end 592 of the cavity 562. Leading from the cavity 562 to the motor inlet 566 is a larger orifice 596. In one embodiment, the small orifice can have a diameter of 0.020 inches, whereas the larger orifice 596 can have a diameter ranging from 0.085 to 0.125 inches. Given the range of diameters for the larger orifice, the speed with which the soft start system operates can be adjusted.

Figure 12:
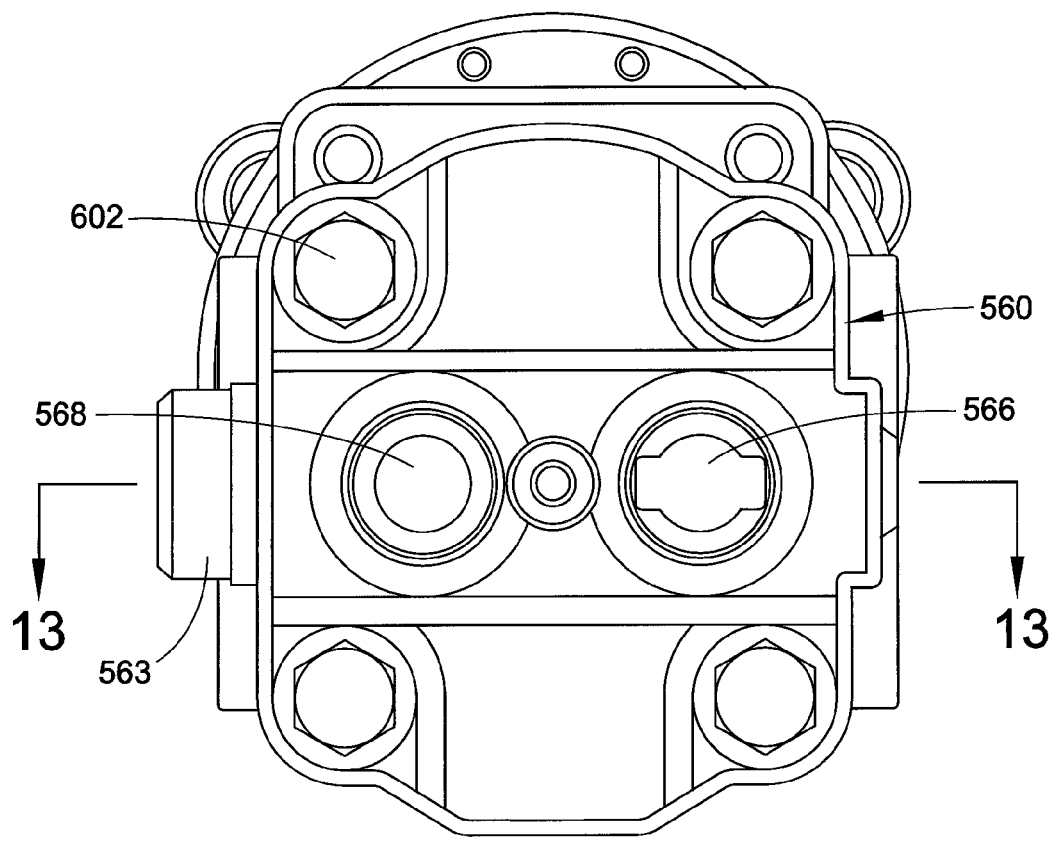
FIG. 12 is a rear elevational view of the system of FIG. 11 along line 12-12.

With reference now to FIG. 12, it can be seen that the valve housing 560 can be somewhat cruciform in end view, such that the four corners of the valve housing 560 can each be provided with a suitable aperture through which respective fasteners 602 can extend through aligned apertures in the plate 548 and into respective bores (not visible) in the motor housing second section 540. In this way, a sturdy connection of the valve housing 560 to the hydraulic motor 530 can be accomplished.

Figure 10:
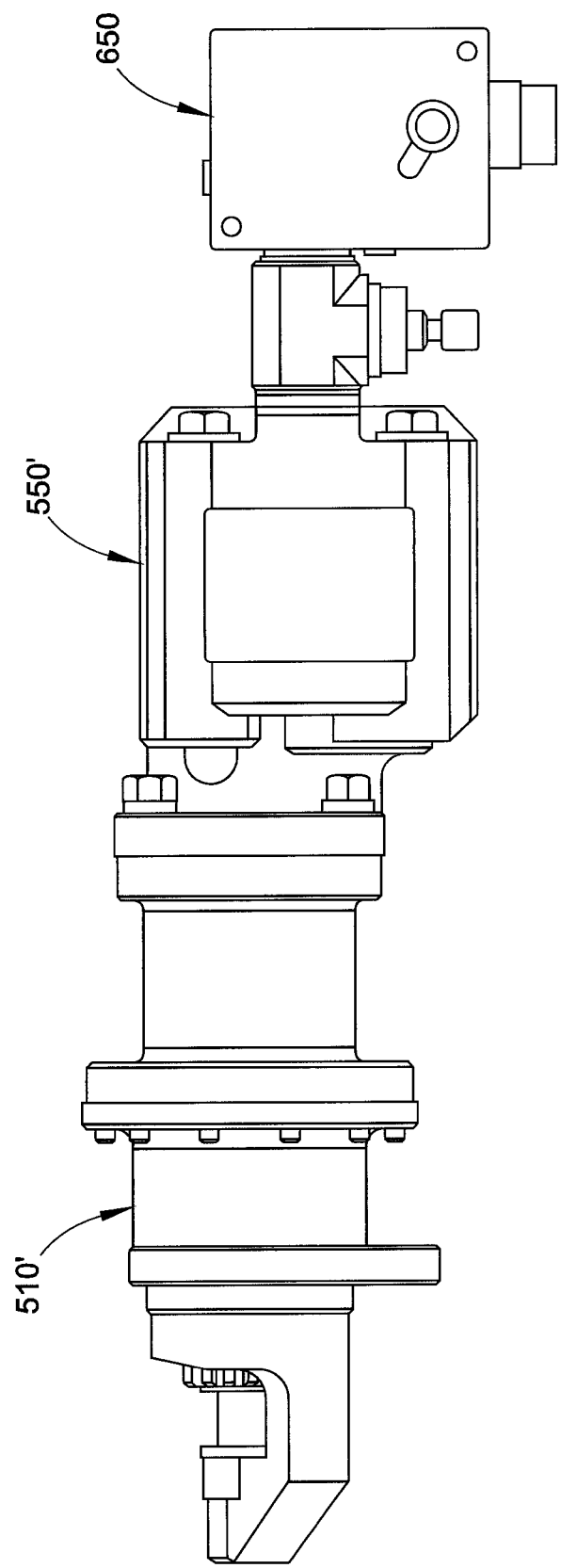
FIG. 10 is a side elevational view of an externally plumbed soft start system.
Figure 11:
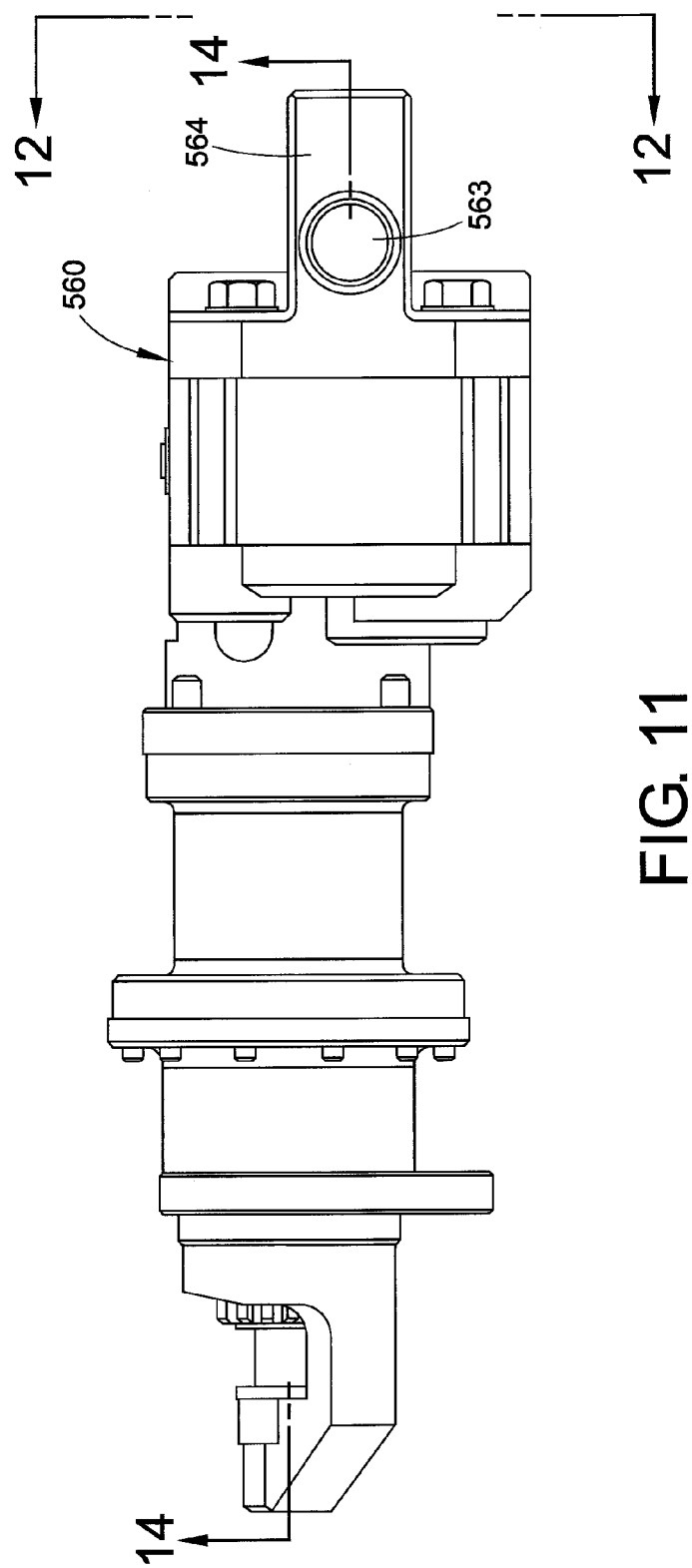
FIG. 11 is a side elevational view of an integrated soft start system according to the present disclosure.

With reference now also to FIG. 10, it can be seen from a comparison of FIGS. 11 and 10 that a system in which an external soft start housing 650 is connected to a hydraulic motor housing 550' and to a starter 510' requires additional space. Because space can be at a premium in an engine compartment of a vehicle, such as that of a truck or the like, the embodiment of FIG. 11 is advantageous over that illustrated in FIG. 10 because it is more compact. In one embodiment, the system of FIG. 11 is shorter than the system of FIG. 10 by almost four inches.

Figure 15:
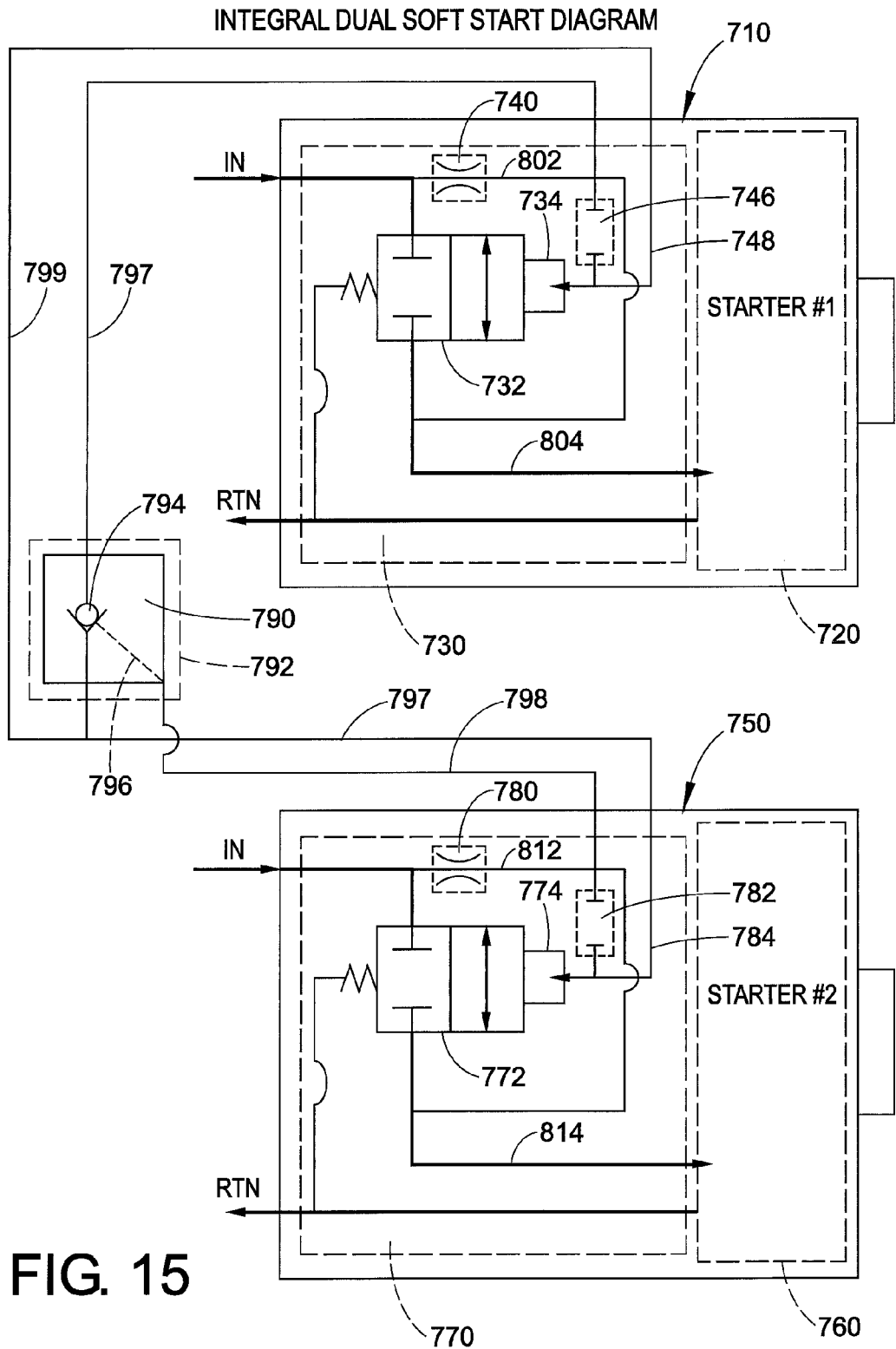
FIG. 15 is a hydraulic schematic of a dual soft start system employing integrated assemblies according to one embodiment of the present disclosure.

With reference now to FIG. 15, a hydraulic circuit diagram of a dual soft start system according to another embodiment of the present disclosure is there illustrated. Such a dual system may be necessary for particularly large internal combustion engines that require significant starting torque. Sometimes, such a dual soft start system is also employed with an engine for the purpose of redundancy. In case one soft start system does not function, the other system could be used to start the engine.

With an integrated dual soft start system as shown in FIG. 15, a common housing 710 can accommodate both a first starter section 720, as well as a first valve section 730. Comprising the first valve section is a flow control valve 732 which is actuated by a hydraulic pilot 734. Also provided is a first flow restricting orifice 740. In this embodiment, there is no second flow restricting orifice provided in the first valve section. Instead, only a plug 746 is employed. A fluid line 748 is provided in the first valve section for communicating with the pilot 734.

Similarly provided is a second common housing 750 which accommodates a second starter section 760 and a second valve section 770. Located in the second valve section is a second flow control valve 772 which is selectively actuated by a second pilot 774. Also provided in the second valve section is a first flow restriction orifice 780. There is no second flow restriction orifice in this embodiment. Rather, a plug 782 is located there. However, a fluid line 784 is provided in the second valve section 770 which communicates with the second pilot 774.

The two starters are selectively actuated by a synchronizer valve 790. The synchronizer valve is mounted in its own housing 792. As is evident, the valve 790 can be a relatively simple check valve 794 which can also be opened via a pilot line 796. In this embodiment, only a relatively modest number of hydraulic conduits are necessary to connect the synchronizer valve to the first and second common housings 710 and 750. More specifically, a conduit 797 communicates with both the fluid line 784 leading to the second pilot 774 and also with the valve 790, namely, the check valve 794. A second conduit 798 communicates with the pilot line 796 of the valve 790 on one end and terminates at the plug 782 at the other end. The conduit 797 also communicates with a line 799 that leads to the fluid line 748 and communicates with the pilot 734 of the first valve section 730. Downstream from the check valve 794, the conduit 797 leads to the plug 746 in the first valve section 730.

As hydraulic fluid enters the first valve section 730, it passes through the flow restricting orifice 740 via a line 802. Hydraulic fluid, after it flows past the flow restricting valve 740, can flow towards the flow control valve 732. A branch line 804 leads the depressurized hydraulic fluid towards the first starter section 720. Until the first flow control valve 732 is opened, hydraulic fluid cannot flow at full pressure to the first starter section 720.

At the same time, hydraulic fluid can enter the second valve section 770 flowing through the second flow restriction orifice 780 via line 812. Fluid at a lower pressure can then flow via line 814 to the second starter section 760. Fluid at a higher pressure will only flow to the second starter section once the second flow control valve 772 is opened.

It should be appreciated that flow line 812 communicates with line 798 that leads to the pilot line 796, thus, opening the check valve 794 under desired circumstances. As the starter in the first starter section 720 engages the engine (not illustrated in FIG. 15), hydraulic back pressure develops in line 804 which in turn is communicated to hydraulic fluid line 797 and the back side of check valve 794. The second starter section 760 engages the engine and develops back pressure in line 814 which in turn is felt in line 798, as well as the pilot line 796 leading the check valve 794. Thus, check valve 794 is unseated. After this happens, hydraulic fluid is allowed to flow to pilots 734 and 774 via lines 799 and 797, respectively. Synchronization of the shift to a full power mode is achieved by requiring a signal from both starters verifying that they have engaged the engine.

With reference again to FIG. 13, signal ports 816 and 819 can be provided in the valve housing 560 in order to adapt the valve housing for dual motor applications. The other ports in the valve housing, namely, ports 817 and 818, are simply construction ports in this embodiment. These four ports 816, 817, 818 and 819 are plugged unless they are in use.

Figure 16:
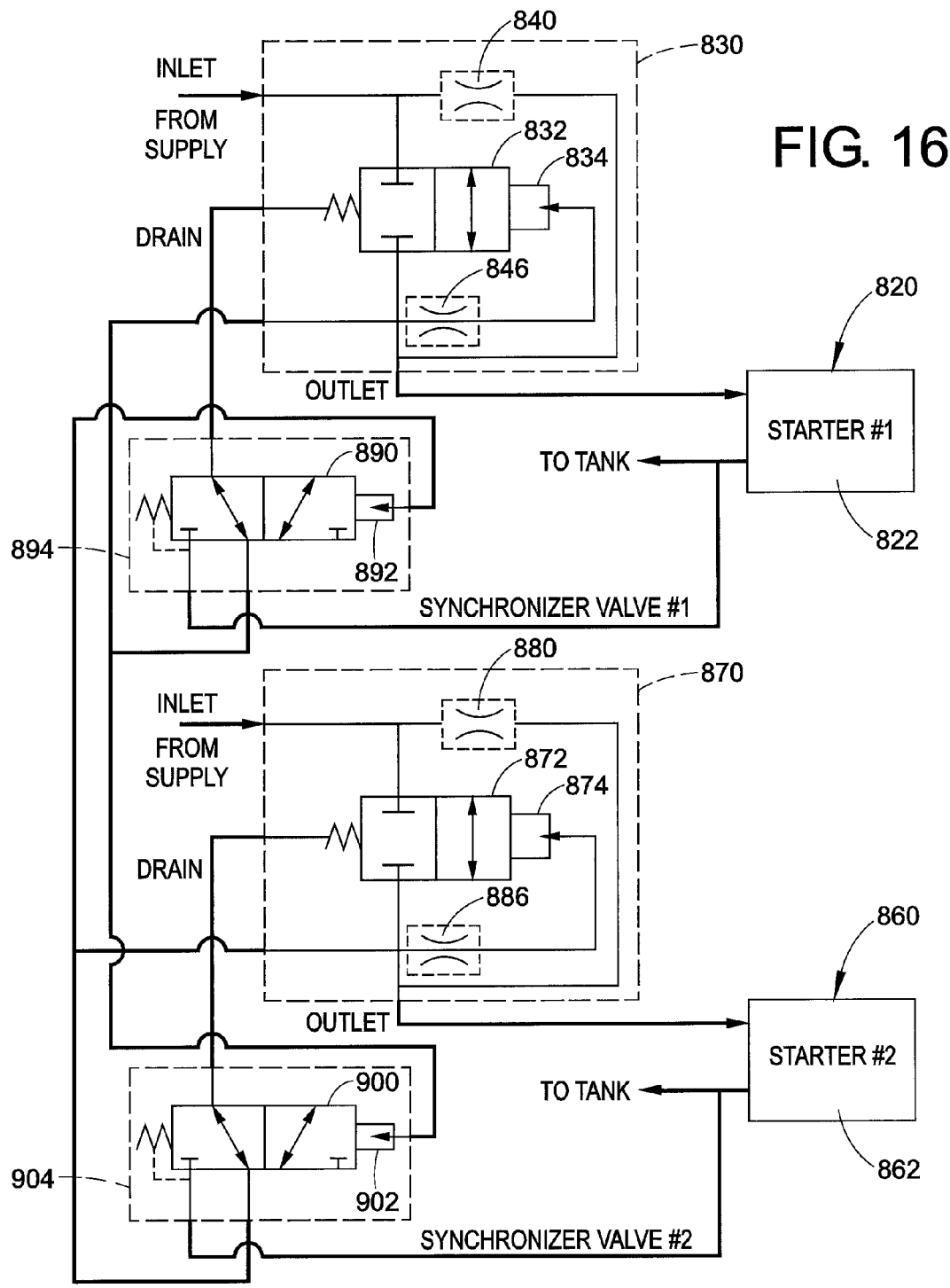
FIG. 16 is a hydraulic schematic of an externally plumbed dual soft start system.

With reference now to FIG. 16, disclosed there is a hydraulic circuit diagram for an external dual soft start system. This includes a first starter 820 located in its housing 822 and, spaced therefrom, a first valve housing 830 which contains a flow control valve 832 which is actuated by a hydraulic pilot 834. Also provided is a first flow restriction valve 840 and a second flow restriction valve 846 spaced therefrom. The external dual soft start system also includes a second starter 860 mounted in its housing 862. Spaced therefrom is a second valve housing 870 which accommodates a second flow control valve 872 and its respective hydraulic pilot 874. Located in the second valve housing are a first flow restriction orifice 880 and a second flow restriction orifice 886 spaced therefrom.

To control the external dual soft start system, two synchronizing valves are needed. Required are a first synchronizing valve 890 which is actuated by a hydraulic pilot 892 and is mounted in a first synchronizer valve housing 894. Also necessary is a second synchronizing valve 900 which is similarly actuated by a hydraulic pilot 902 and mounted in a second synchronizer valve housing 904. Each of the synchronizer valves is a two envelope two position three-way valve. In contrast to the pilot operated check valve 790 illustrated in FIG. 15, the synchronizer valves of FIG. 16 are inherently more complex. Moreover, two of them are necessary in order to control the external dual soft start system illustrated in FIG. 16.

Furthermore, it should be apparent from a comparison of FIGS. 15 and 16 that the hydraulic circuit diagram of FIG. 16 is much more complicated in order to accommodate the use of two synchronizer valves and the provision of separate starter housings and valve housings. Many more conduits are necessary, not to mention the need for two synchronizer valves. It should be appreciated that each additional external fluid connection increases the risk of leaks and malfunctions. Thus, the integral dual soft start system illustrated in FIG. 15 is much preferable to the external dual soft start system illustrated in FIG. 16.

If the housing is provided with access ports which allow a synchronization of multiple motors via the use of a synchronizing out port and a pilot in port, also located in the housing, certain advantages are gained as discussed above in connection with FIG. 15, as well as FIG. 13. In the embodiment discussed, a blocking plug replaces a flow restriction orifice in order to allow control of pilot operated flow control valves by the use of an external synchronizer valve.

The above disclosed hydraulic soft start system has potential applications for any hydraulic starter system where shock loads can be several times as severe as with electric starters used in the same applications. In addition, the instant manifold assembly or system could also be used for other hydraulic applications which require the slow activation while loading or meshing of components is completed prior to full pressurization of equipment.

In particular, the above disclosed soft start system or manifold assembly can include the following features: 1) system pressure regulation with bypass or unloading capabilities for a hydraulic pressure supply source; 2) over-pressure protection for the entire system; 3) pressure monitoring capabilities; 4) manifold assembly is remote start ready; 5) SAE ports (which provide good reliable connections) can be used for all connections to the manifold assembly or "smart block" including the system pressure gauge; 6) an adjustable control of slow start parameters including: (a) time delay between slow start (reduced pressure and flow to the starter) initiation and full start (full pressure and flow to the starter) initiation—controlled by the size of the second flow restricting orifice and (b) pressure and flow characteristics of the slow start phase delivered to the motor—controlled by the size of the first flow control orifice; and 7) an automatic shutoff feature tied to the starting of an engine through the electrical and/or hydraulic control of the first and/or second flow control valves.

The above disclosure provides for a number of advantages over the prior art soft start systems. These include: 1) the ability to have an "all-in-one", "unitary", or "integrated" valve assembly for controlling the parameters associated with a hydraulic system in one location (which affords a significant advantage over prior art systems requiring multiple discrete components to be added to the system). Also, having an integrated valve assembly results in fewer fluid connections and other associated potential leak sources; 2) the use of SAE fittings on all connections (instead of NPT connections which require tape or sealant, etc.) also makes the fluid connections less susceptible to leaks caused by vibration over time and the system less susceptible to contamination from tape or sealant (as typically used on NPT fittings); 3) a two level or two stage application of pressurized hydraulic fluid allows for faster cranking speeds by applying full system pressure sooner and faster as compared to the "throttled" prior art approach. Cranking speed and hydraulic fluid conservation are of a major concern especially when the available volume of pressurized hydraulic fluid is limited (i.e., to replenish pressurized hydraulic fluid without the engine running typically requires the use of a manual hand pump—a slow and laborious operation that is preferably avoided); 4) the use of fast acting poppet valves assures quick transition to full flow and pressure as well as an immediate stoppage of flow when the "start" or driving cycle is complete; 5) temperature variations are less likely to affect valve operation of the present disclosure due to the use of the two-stage/fluid flow approach (i.e., by comparison, a throttle valve approach will generate more heat and be more affected by varying fluid viscosity); 6) the modular valve design of the instant disclosure (by the use of cartridge style valves) allows for easy servicing, disassembly, inspection of the manifold assembly and replacement of valves when necessary; 7) the integrated valve/manifold assembly or "smart block" valve layout places all of the adjustable components (e.g., the unloading valve, pressure sensing valve, relief valve, pressure gauge, etc.) in one location or side of the housing or block for ease of access and setup; 8) changing the timing of the first initial, lower or reduced flow delivered to the motor can be done by simply changing or swapping out different orifice sizes. Moreover, the orifices can be easily accessed under SAE port plugs in the manifold or valve housing.

This disclosure has been described with reference to several embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An integrated soft start and hydraulic motor assembly, the assembly comprising:
   a valve housing;
   a pressure source port defined in the valve housing for receiving pressurized hydraulic fluid from an associated hydraulic pressure source;
   a hydraulic motor housing to which the valve housing is attached and with which the valve housing is in fluid communication, the associated hydraulic pressure source supplying hydraulic fluid to the valve housing which regulates a flow of the hydraulic fluid to the motor housing to start a hydraulic motor mounted in the hydraulic motor housing;
   a drain port defined in the valve housing and positioned in a downstream location from said hydraulic motor;
   a pilot operated flow control valve located in the valve housing and including a pilot, an inlet, and an outlet, the inlet being in fluid communication with the pressure source port and the outlet being in fluid communication with the hydraulic motor;
   a first flow restricting orifice located in the valve housing in fluid communication with and disposed between the pressure source port and the hydraulic motor;
   a second flow restricting orifice located in the valve housing in fluid communication with and disposed between the pilot and the hydraulic motor; and
   wherein when pressurized hydraulic fluid is supplied to the pressure source port, a first fluid flow is passed from the pressure source port via the first orifice to the hydraulic motor placing the hydraulic motor in a first partially-actuated low power state, a portion of the first fluid flow being passed via the second orifice to the pilot placing the valve in an open state after an actuation pressure is reached and allowing a second fluid flow to pass from the pressure source port to the hydraulic motor, a pressure of the second fluid flow being higher than is a pressure of the first fluid flow, thereby placing the hydraulic motor in a second fully-actuated high power state subsequent to the first partially-actuated low power state.

2. The assembly of claim 1, wherein a diameter of said second flow restricting orifice is smaller than a diameter of said first flow restricting orifice.

3. The assembly of claim 1 further comprising a starter housing and a mounting structure for mounting to the motor the starter housing.

4. The assembly of claim 3 wherein a motor gear mounted in the motor housing cooperates with a starter pinion mounted in the starter housing.

5. The assembly of claim 3 wherein the mounting structure comprises a spool.

6. The assembly of claim 1 wherein the valve housing comprises at least one flange including a fastener aperture which is aligned with a fastener bore located in the motor housing and further comprising a fastener extending through the flange fastener aperture and into the motor housing fastener bore.

7. The assembly of claim 1 wherein the motor housing includes a proximal end adjoining a distal end of the valve housing, the motor housing proximal end comprising an annular groove for accommodating a sealing element for sealing against the valve housing distal end.

8. The assembly of claim 7 wherein the valve housing distal end includes an inlet bore which communicates with a motor gear bore defined on the motor housing proximate end and an outlet bore, spaced from the inlet bore, which also communicates with the motor gear bore.

9. The assembly of claim 1 wherein the valve housing further includes a signal port for dual motor applications.

10. The assembly of claim 9 further comprising a synchronizer valve communicating with the pilot operated flow control valve.

11. An integrated dual soft start assembly, comprising:
a first housing including:
a first motor section including a first motor gear;
a first valve section operably connected to said first motor section wherein the first valve section is in fluid communication with the first motor section;
a second housing including:
a second motor section including a second motor gear;
a second valve section operably connected to said second motor section wherein the second valve section is in fluid communication with the second motor section;
wherein the first and second motor sections are operably connected to a respective associated starter pinion; and
a synchronizer valve communicating with first and second pilot operated flow control valves located respectively in said first and second valve sections, the synchronizer valve selectively directing a pressurized hydraulic fluid to pilots of the first and second pilot operated flow control valves to selectively actuate both the first and second motor gears simultaneously.

12. The assembly of claim 11 wherein each of the first and second valve sections includes:
a pressure source port for receiving pressurized hydraulic fluid;
a drain port spaced from the pressure source port; and
a first flow restricting orifice in fluid communication with and disposed between the pressure source port and a respective hydraulic motor housed in each of said first and second motor housings.

13. The assembly of claim 12 wherein each of the first and second valve sections further includes a second flow restricting orifice in fluid communication with the respective hydraulic motor and wherein a diameter of the second flow restricting orifice is smaller than a diameter of the first flow restricting orifice.

14. The assembly of claim 11 wherein the first housing further comprises a synchronizing port.

15. The assembly of claim 11 wherein the synchronizer valve comprises a check valve.

16. The assembly of claim 15 wherein the check valve is pilot operated.

17. The assembly of claim 11 wherein the synchronizer valve is mounted in a housing separate from the first and second housings.

18. An integrated starter assembly comprising:
a valve housing;
a motor housing to which the valve housing is attached and with which the valve housing is in hydraulic fluid communication, wherein an associated hydraulic pressure source supplies hydraulic fluid to the valve housing;
a pilot operated flow control valve located in the valve housing for regulating a flow of the hydraulic fluid to the motor housing to start a hydraulic motor mounted in the motor housing;
the flow control valve including a pilot, and inlet, and an outlet, the inlet being in fluid communication with a pressure source port defined on the valve housing and the outlet being in fluid communication with the hydraulic motor;
a first flow restricting orifice located in the valve housing and in fluid communication with and disposed between the pressure source port and the hydraulic motor;
a conduit located in the valve housing and in fluid communication with the pilot; and,
wherein once pressurized hydraulic fluid is supplied, a first fluid flow is passed via the first orifice to the hydraulic motor in a first partially actuated low power state, and a second fluid flow is passed via the conduit to the pilot placing the valve in an open state after an actuation pressure is reached thus allowing the second fluid flow to pass to the hydraulic motor, a pressure of the second fluid flow being higher than is a pressure of the first fluid flow thereby placing the hydraulic motor in a second fully actuated high power state subsequent to the first partially actuated low power state.

19. The assembly of claim 18, wherein disposed in the conduit is a second flow restriction orifice and wherein a diameter of said second flow restricting orifice is smaller than is a diameter of said first flow restricting orifice.

20. The assembly of claim 18, further comprising a synchronizer valve wherein the conduit communicates with the synchronizer valve.

* * * * *